United States Patent

[11] 3,597,842

| [72] | Inventor | Edmund G. Greene |
| --- | --- | --- |
| | | 1314 Singing Tree, Memphis, Tenn. 38116 |
| [21] | Appl. No. | 869,661 |
| [22] | Filed | Oct. 27, 1969 |
| [45] | Patented | Aug. 10, 1971 |

[54] PORTABLE CLIPPER APPARATUS
6 Claims, 6 Drawing Figs.

[52] U.S. Cl. .................................................. 30/198
[51] Int. Cl. .............................................. B26b 19/02
[50] Field of Search .................................. 30/167, 198, 210, 231, 232, 276, 296, 298; 56/26.5, 233, 236

[56] References Cited
UNITED STATES PATENTS

| 1,116,995 | 11/1914 | Casteran | 30/276 |
| --- | --- | --- | --- |
| 1,805,864 | 5/1931 | Benzel | 30/198 |
| 2,263,431 | 11/1941 | White | 30/276 X |
| 2,485,963 | 10/1949 | Godfrey | 30/276 X |
| 2,748,476 | 6/1956 | Cooper | 30/198 X |

Primary Examiner—Robert C. Riordon
Assistant Examiner—J. C. Peters
Attorney—John R. Walker, III ABSTRACT: Portable clipper apparatus including an elongated handle for use in combination with a conventional reciprocating hedge trimmer for extending the reach thereof which simplifies trimming wide beds of formal hedgelike growth prevalently used artistically in the art of landscape architecture and for use in nurseries. Also included in the apparatus is a conventional portable generator which provides electrical power for operating the hedge trimmer at locations that may be far reaching from commercial power outlets and/or remotely situated.

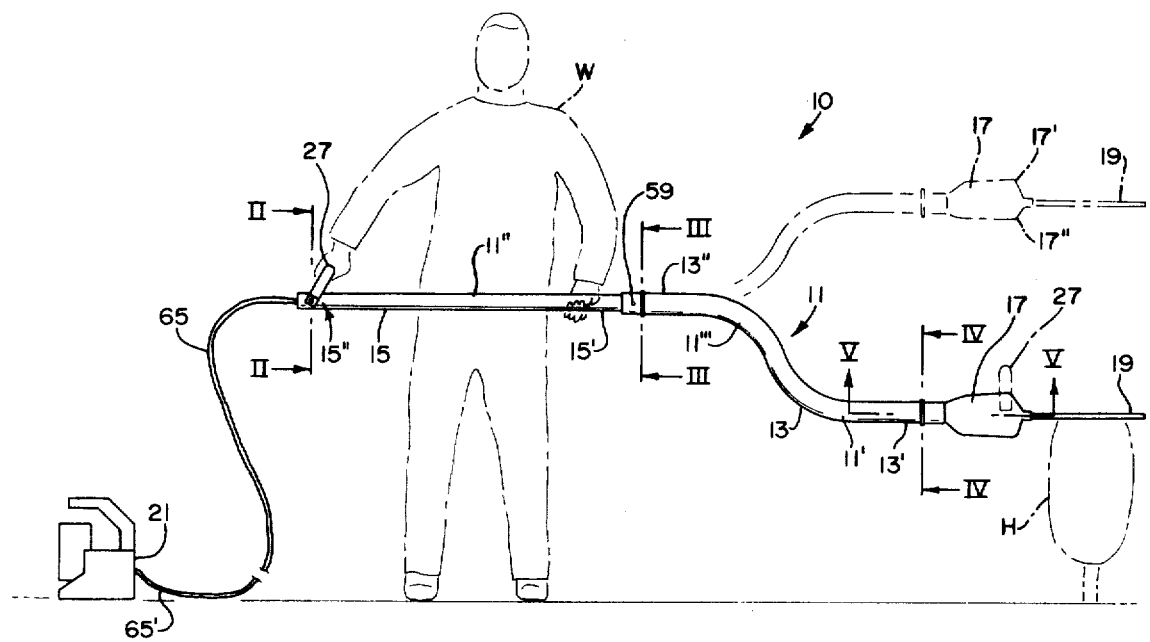
FIG. 1
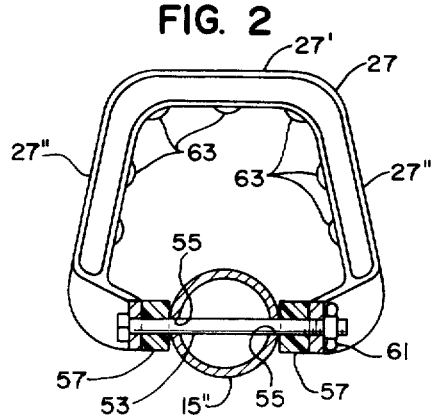
FIG. 2
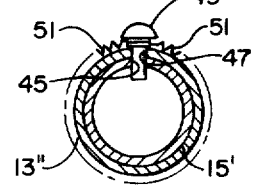
FIG. 3
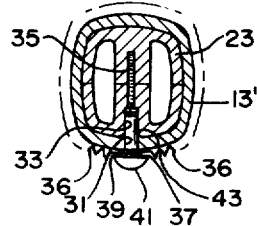
FIG. 4
FIG. 5
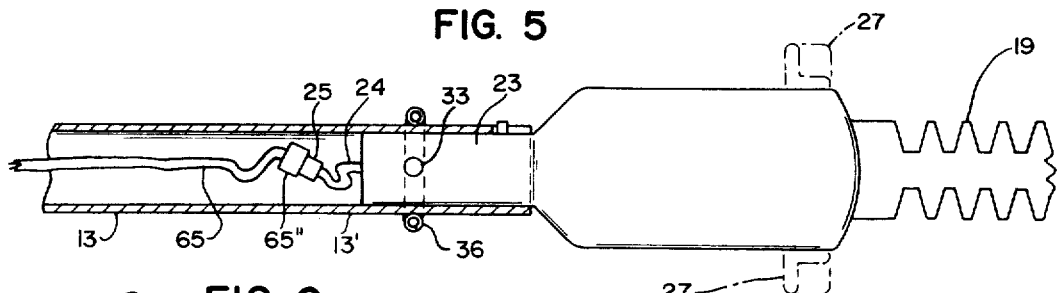
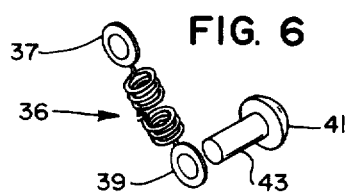
FIG. 6
INVENTOR.
EDMUND G. GREENE
BY John R. Walker, III
Attorney

PORTABLE CLIPPER APPARATUS

BACKGROUND OF THE INVENTION

1. Field of the Invention

This invention relates to a portable clipper apparatus for use in trimming hedges, shrubs, plants and the like.

2. Description of the Prior Art

The most widely used devices for hedge trimming are the hand-operated hedge clippers which have an appearance resembling a large pair of scissors having two straight handles, one for each hand. Electric-powered hedge trimmers were developed to make the task of hedge trimming easier and less time consuming. Many different types are being manufactured and marketed by various trade names but the problem of trimming a wide bed of hedge or the like still remains. Also, there is a problem of trimming in nurseries where potted plants, hedges and the like are arranged in groups which provide an almost solid and broad expanse of vegetation that is difficult to trim since without moving the pots, the person doing the trimming cannot get between them. While the electric hedge trimmer did make the task of hedge trimming easier, its use was more confining than hand-operated hedge clippers because it could only be used in proximity to commercial electrical outlets. Around many homes, it is unwieldy to lay out great lengths of electric power cable to operate an electric hedge trimmer. Moreover, some hedge growth is remotely situated where the use of an electric hedge trimmer has heretofore been considered virtually impossible. Recent advancements in developing and marketing of efficient, lightweight and relatively inexpensive portable generators having an internal combustion engine now makes it possible to economically operate an electric-powered hedge trimmer at remote sites. A need for an internal combustion engine powered trimmer was recognized by Beneke U.S. Pat. No. 3,346,955. His invention was directed towards being capable of trimming trees which is not a consideration of the present invention. The Beneke patent is designed for continued use in trimming heavy tree branches, such as by a professional landscape architect, and would not likely be economically feasible for the average homeowner or the like.

SUMMARY OF THE INVENTION

The present invention is directed towards providing a portable clipper apparatus including an elongated tubular extension handle for use in combination with a conventional reciprocating hedge trimmer that will: (1) Extend the reach of the hedge trimmer, enabling the user to trim the tops of hedge growth, individual ornamental plants, or the like which may be situated in a dense broad grouping or artistic arrangement, the width of which greatly exceeds the normal reach of the average person; (2) Have an offset bend which will enable the user to trim from a standing position the tops of hedge growth or the like forming a horizontal plane the height of which would be approximately knee high; (3) Have an offset bend which will enable the user to trim, while standing on the ground and not stretching, tops of hedge growth or the like forming a horizontal plane the height of which would be approximately shoulder high or higher; (4) Have at least two parts or sections, one being straight and the other having an offset bend. These may be joined so that the offset section is positioned between the hedge trimmer and the straight section or the section having an offset bend may be attached to the hedge trimmer and utilized independent of the straight section.

An object of the invention is to combine the above combination with a lightweight portable generator to facilitate operating the electric powered hedge trimmer at far-reaching locations, such as perimeters of large lots where it would be unwieldy to lay out great lengths of electric power cable. Also, this combination enables the electric-powered hedge trimmer to be operated at remote sites where commercial outlets of electricity are not to be found.

The advantages gained by employment of the present invention are: (1) In attempting to trim hedge growth or the like situated in a dense broad grouping, it is difficult to walk between the plants. Some plants used for forming artistic groupings or in nurseries are brittle and snap very easily, walking between closely arranged plants of this species to gain access for trimming would break off branches creating a detriment to the intended aesthetic effect. Also, some plants used for this purpose are thorny and walking between closely arranged plants of this species to gain access for trimming would be very annoying and uncomfortable. Extending the reach of the hedge trimmer with the present invention further into the dense grouping makes it possible to stand outside the perimeter of the artistic plant arrangement and trim accordingly.

(2) Some landscape design groupings or groupings in nurseries are required to be trimmed approximately at knee level. Conventional hedge trimmers require the user to bend over or stoop which causes fatigue easily. Trimming one or two bushes in this position presents little or no problem but some hedge of this species extend for a few hundred linear feet. Many homeowners prefer to do their own gardening and maintenance of their grounds. After working at their usual occupation all day they desire to accomplish their household tasks as effortlessly as possible. Using the offset extension handle of the present invention, attached to a conventional electric hedge trimmer with the offset dipping downwardly, enables the user to stand upright while trimming the tops of hedge plants or individual ornamental plants in groups forming a horizontal plane the height of which is substantially knee level.

(3) Conversely, some plant groupings are required to be trimmed approximately shoulder high or higher. Conventional hedge trimmers require the user to either utilize a step ladder or stretch up with arms extended upwardly which also causes fatigue easily, and in addition there is the hazard of falling. For like reasons as explained before, the object is to accomplish this task as effortlessly as possible. Using the offset extension handle of the present invention, attached to a conventional electric hedge trimmer with offset extending upwardly, enables the user to stand comfortably and trim the tops of hedge plants.

BRIEF DESCRIPTION OF THE DRAWING

FIG. 1 is a view showing the portable clipper apparatus of the present invention being operated by the user to trim hedge plants.

FIG. 2 is a sectional view taken as on the line II–II of FIG. 1.

FIG. 3 is a sectional view taken as on the line III–III of FIG. 1.

FIG. 4 is a sectional view taken as on the line IV–IV of FIG. 1.

FIG. 5 is a sectional view taken as on the line V–V of FIG. 1.

FIG. 6 is a perspective exploded view of spring and rivet assembly.

DESCRIPTION OF PREFERRED EMBODIMENT

The portable clipper apparatus 10 of the present invention includes in general an elongated handle 11, including a first part of section 13 and a second part of section 15; a reciprocating electric-powered hedge trimmer 17; and a lightweight portable AC gasoline-powered motor-generator 21 intended for use by a workman W engaged in the task of trimming an artistic grouping of hedge growth H, individual ornamental plants or the like, which may be found in a typical landscape design or in groupings of potted plants and the like in a nursery. More specifically, handle 11 is intended for use in combination with a conventional reciprocating hedge clipper or trimmer 17 for extending the reach of hedge trimmer 17, enabling the workman W to trim the tops of hedge growth H or the like which may be situated in a dense broad grouping or artistic arrangement, the width of which greatly exceeds the normal reach of the average person. Additionally, this invention is intended to combine the above combination with the usual gasoline-powered portable generator 21 to facilitate operating hedge trimmer 17 for trimming hedge growth H which may be situated at remote locations. Handle 11 may be used while standing in a comfortable position to extend the reach into wide beds of hedge H and in addition lower the cutting height of the reciprocating blade assembly 19 to approximately knee height, as shown in solid lines in FIG. 1. Handle 11 may be rotated 180° placing hedge trimmer 17 in an inverted position and at the same time elevating blade assembly 19 to approximately shoulder height, as shown in broken lines in FIG. 1. This makes it possible to trim the tops of hedge growth H to a substantially shoulder height or higher from a rather comfortable standing position with arms generally relaxed. In addition, it will be understood that the hedge trimmer 10 may be utilized to trim especially tall shrubs or trees with two parts 13, 15 or more parts telescopically joined, if necessary. Inverting the hedge trimmer 17 in this manner does not interfere with the work, since blade assembly 19 is substantially centered within the hedge trimmer 17 or approximately equal distance from the uppermost portion of hedge trimmer housing 17' to the horizontal plane of blade assembly 19 as from the lowermost portion 17''.

Hedge trimmer 17 includes a handle 23, a short power cord 24 and a male plug 25, as best viewed in FIG. 5, and originally a handgrip 27, as shown in broken lines in FIG. 1.

Elongated handle 11 is formed from thin wall aluminum tubing or the like. For purposes of clarity of description handle 11 is considered to include a proximal end portion 11', a distal end portion 11'', and a curved intermediate portion 11''' joining the distal and proximal end portions. First section or part 13 includes proximal end portion 11' and intermediate portion 11''', and second section or part 15 includes distal end portion 11''. Distal end portion 11'' is substantially offset from proximal end portion 11''' in substantially parallel relationship therewith. In other words, the longitudinal axes of said distal end portion 11'' and said proximal end portion 11''' are in spaced parallel relationship. The proximal end 13' of first part 13 is telescoped over handle 23 and is removably attached thereto in a manner yet to be described, as best viewed in FIGS. 4 and 5. Part 13 has an aperture 31 positioned to be in alignment with a recess 33 in trimmer handle 23 when part 13 is telescopically fitted over trimmer handle 23. A bolt 35 is used by the manufacturer of hedge trimmer 17 to secure the two clamshell like portions of handle 23 together, bolt 35 being well recessed into trimmer handle 23 leaves the recess 33 existing above the bolt 35 after same has been installed and tightened securely. Recess 33 is made use of to removably secure part 13 to trimmer handle 23 thusly: a pull spring 36 includes a pair of rings 37, 39 one at each end, the inner diameter of each of which substantially conforms to the diameter of the shank portion 43 of a rivet 41. Rivet 41 is passed through rings 37, 39 and aperture 31 after spring 36 has been positioned around the other surface of part 13. It should be understood that part 13 has been telescopically fitted over trimmer handle 23 and rings 37, 39 are aligned with aperture 31 and recess 33 which allows the shank portion 43 of the rivet 41 to be passed through each respectively. The snug fit of part 13 over trimmer handle 23 reduces the problem of removably securing them together and prevents part 13 from sliding off handle 23. This is accomplished by rivet 41 being removably inserted into aperture 31 and recess 33 as described above. Rivet 41 is springably removably secured in place by spring 36 encircling the outer surface of part 13 with rings 37, 39 overlapping one another and close-fitting holes passed over rivet shank 43 which pull transversely in opposite directions on rivet shank 43, providing the necessary holding force to prevent rivet 41 from falling out of position.

The elongated tubular part 15 of handle 11 being formed of thin wall aluminum tubing or the like and having an aperture 45 adjacent the end 15' is telescopically fitted into part 13 which has an aperture 47 positioned adjacent the end 13'', as best viewed in FIG. 3. The two parts 13, 15 are removably secured together by a rivet 49 which is held in place by a spring 51 in exactly the same manner as rivet 41 and spring 36 described above.

The handgrip 27 is removed from hedge trimmer 17 and is pivotally secured to part 15 by a bolt 53, best viewed in FIG. 2, which is inserted through the existing holes in handle 27 and the transversely drilled holes 55 adjacent end 15'' of part 15. A pair of tubular spacers 57 being formed of plastic or the like are tangentially positioned one on each side of part 15 and encircle bolt 53 filling the space equal to the difference between the handgrip 27 mount dimensions on hedge trimmer 17 and the diameter of part 15. A wingnut 61 is installed on the threaded end of bolt 53 and hand tightened securely.

Part 13 has transversely drilled holes 59 adjacent end 13'' to also accommodate installation of handgrip 27. In situations where the extra length of both parts 13, 15 is not required, part 15 may be quickly and easily removed from part 13 by removing rivet 49 from apertures 47 and 45, then simply pulling the two pieces apart. Handgrip 27 may be removed from part 15 and installed on part 13 with bolt 53 being received through apertures 59 adjacent the handle end 13'', with handgrip 27 pivoting about bolt 53 and the tubular spacers 57 being positioned as described for installing the handgrip 27 on part 15. Wingnut 61 is again installed on bolt 53 and hand tightened securely. A plurality of arcuate ridges 63 are symmetrically arranged and molded into the interior gripping surface of handgrip 27 providing an antislip feature for the fingers of the workman W. An elongated power cable 65 having a male plug, not shown, attached on the end 65' and a female plug 65'' attached on the other end is plugged on the end 65' into the portable generator 21 which has a standard electrical outlet, not shown. It should be understood that cable 65 is threaded through tubular parts 13, 15 with female plug 65'' engaging male plug 25 before part 13 is removably attached to handle 23. By running cable 65 through handle 11, the cable is kept out of the way during the use of apparatus 10.

In operation the present invention and combination is connected together as described above and the internal combustion engine of the portable generator 21 is started, delivering the 115 volt AC power required to operate hedge trimmer 17. A single-pole single-throw on-and-off switch, not shown, located on the handle 23 of the hedge trimmer 17, is operated to the on position which in turn causes hedge trimmer blades 19 to begin reciprocating. Blades 19, having the usual double cutting edge, will shear hedge growth or the like when moved in either direction parallel with the lateral axis of blade 19. When the workman W desires to trim the tops of hedge growth H, forming a horizontal plane, the height of which would be approximately knee high, he would hold the device as illustrated in FIG. 1, with one hand and fingers encircling the tubular structure of part 15 and the other hand gripping the upper portion 27' of the grip handle 27 which is substantially parallel to attaching bolt 53. When the workman W desires to trim the tops of hedge growth H, forming a horizontal plane, the height of which is approximately shoulder high, he would rotate the device 180° inverting hedge trimmer 17 and handgrip 27, elevating blade assembly 19 to the desired height. When the workman desires to trim the sides of hedge growth forming a vertical plane, he would rotate the device 90° one way or the other, gripping one of the two portions 27'' of grip handle 27 with one hand and the other hand still encircling the tubular structure of part 15. When the workman W desires to shorten the length of the reach of the device, he may easily remove part 15 and handgrip 27, installing handgrip 27 onto the end of part 13 as previously described. Some work, i.e., trimming hedge growth H, may best be accomplished without either part 13 or 15 installed. In which case, both parts 13, 15 may easily be removed by pulling rivet 41 out of recess 33 and aperture 31, then sliding part 13 off handle 23 as described above. Handgrip 27 may then be installed onto hedge trimmer 17 in its original position returning hedge trimmer 17 substantially to its original configuration. In this configuration it can still be operated in combination with the portable generator 21 or by being plugged into any commercial power outlet. My portable clipper apparatus 10 provides the average homeowner and/or a small business owner or the like with a capability to do a professional hedge-trimming job quickly and with a minimum of effort and expense, trimming wide beds of hedge or the like where commercial outlets are readily accessible, or in far-reaching perimeters of his property where it would be unwieldy to lay out a great length of electrical cable, or in completely remote locations far removed from commercial power outlets.

Although the invention has been described and illustrated with respect to a preferred embodiment thereof, it is to be understood that it is not to be so limited since changes and modifications may be made therein which are within the full intended scope of this invention.

I claim:

1. A portable clipper apparatus comprising a reciprocating electrically driven hedge clipper having an elongated outwardly extending blade and an oppositely extending clipper handle; an elongated handle having a proximal end portion, a distal end portion, and an intermediate portion joining said proximal and distal end portions; means removably attaching said elongated handle at said proximal end portion to said clipper handle to provide an extension of said clipper handle, said distal end portion being substantially offset from said proximal end portion in substantially parallel relationship therewith whereby the longitudinal axis of said proximal end portion is substantially spaced from the longitudinal axis of said distal end portion, and a portable motor-generator means including an electric cord leading therefrom and connected to said hedge clipper providing the electrical power for the driving thereof.

2. The portable clipper apparatus of claim 1 in which said elongated handle comprises tubing having a hollow interior and in which said electric cord extends through the hollow interior of said tubing.

3. The portable clipper apparatus of claim 2 in which said elongated handle comprises two separate parts, a first part which includes said proximal end portion and said intermediate portion, and a second part which includes said distal end portion, and said first part and said second part having the adjacent ends thereof removably and telescopically joined together.

4. The portable clipper apparatus of claim 3 in which is provided aligned apertures through said first and second parts, and in which is included a spring-rivet assembly means comprising a spring having rings provided at the opposite ends thereof and a rivet extending through said rings and said aligned apertures to removably hold said first and second parts together.

5. The portable clipper apparatus of claim 1 in which said means removably attaching said elongated handle to said clipper handle includes a part of said handle at said proximal end portion telescopically fitted over said clipper handle, a recess provided in said clipper handle, an aperture in said proximal end portion aligned with said recess, a rivet extending through said aperture in said proximal end portion and into said recess, and spring means urging said rivet into said aperture and said recess.

6. The portable clipper apparatus of claim 1 in which is included handgrip means removably attached to said distal end portion.